Jan. 10, 1967  C. B. McKINNEY  3,297,053
SELECTOR VALVE

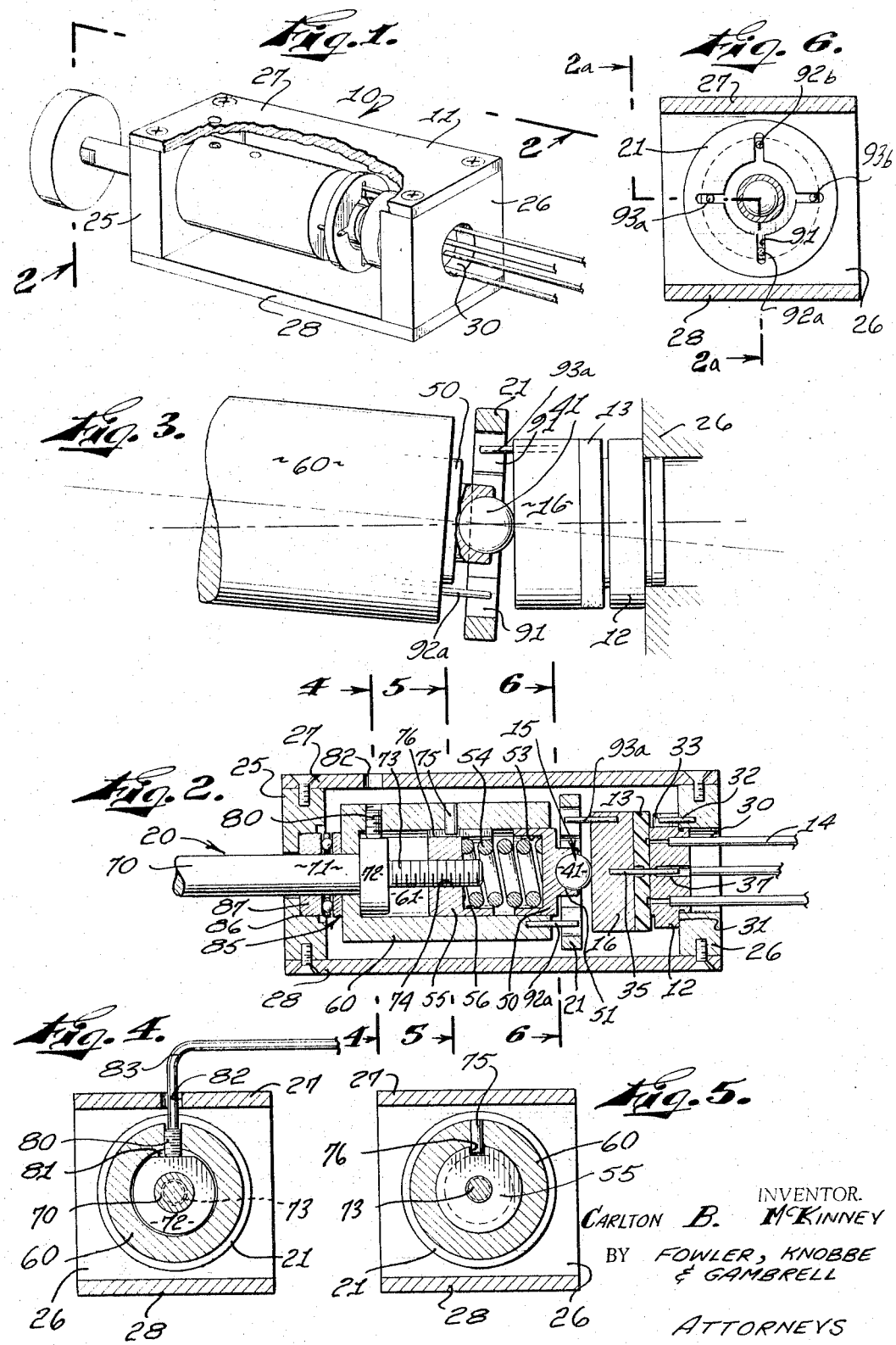

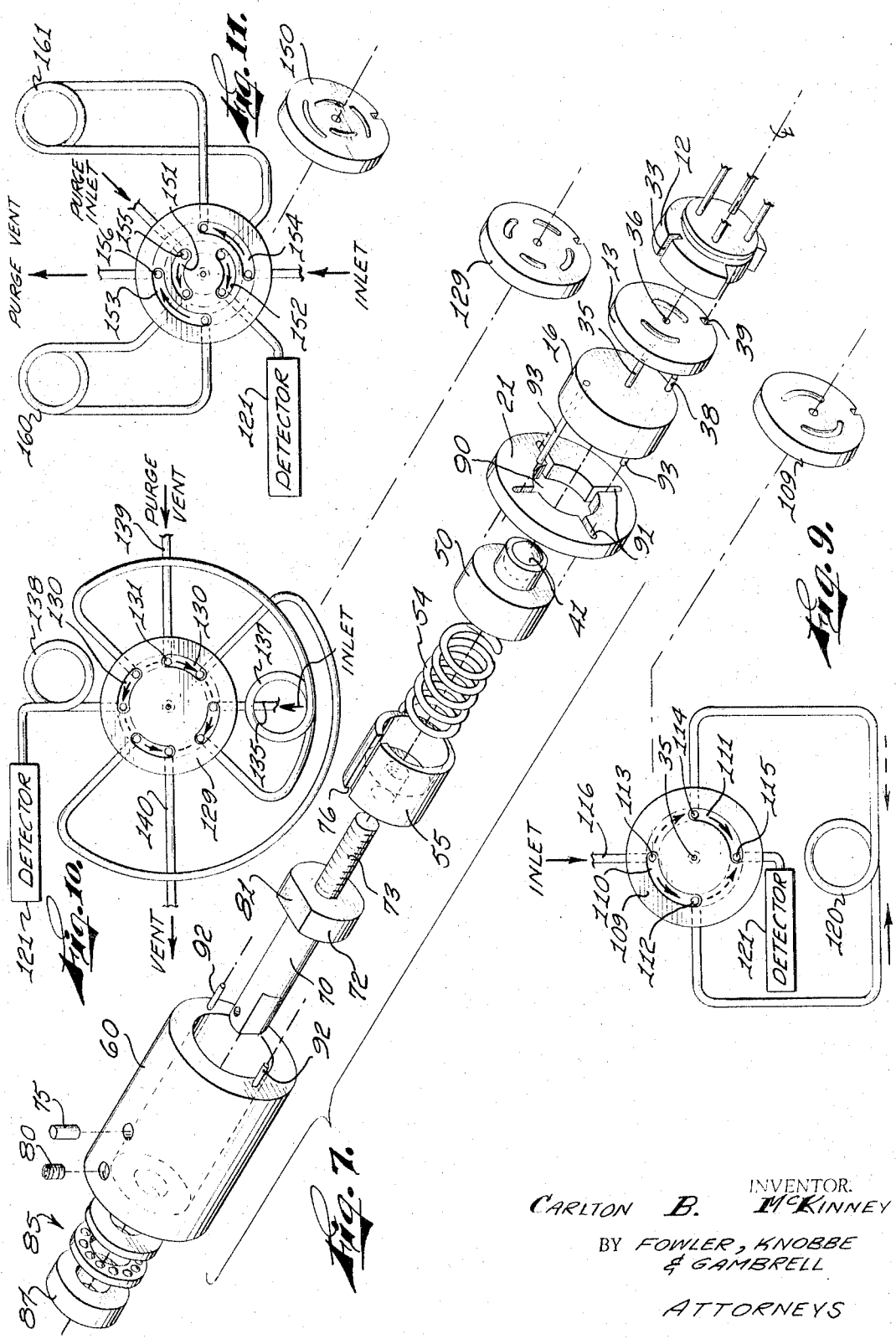

Filed Dec. 30, 1963  3 Sheets-Sheet 3

INVENTOR.
CARLTON B. McKINNEY
BY FOWLER, KNOBBE
& GAMBRELL
ATTORNEYS

United States Patent Office 3,297,053
Patented Jan. 10, 1967

3,297,053
SELECTOR VALVE
Carlton B. McKinney, South Gate, Calif., assignor to Carle Instruments, Inc.
Filed Dec. 30, 1963, Ser. No. 334,272
2 Claims. (Cl. 137—625.46)

The present invention relates to the field of selector valves and particularly to improvements therein for maintaining an absolutely parallel relationship between the abutting faces of the stationary and movable plates of a rotary valve while providing a very high and adjustable loading force therebetween.

The invention finds particular application in gas chromatographic and like systems wherein it is necessary to inject and route through alternate paths extremely small (micro) volumes of vapors and liquids. In a typical gas chromatograph, a small vapor sample is introduced into a stream of carrier gas, for example, helium or nitrogen, and passed through one or more columns packed with a partition material. The components of the vapor separate in the column and are eluted therefrom in the inverse order of their affinity to the partition material so that the component of the vapor sample with the lowest absorption coefficient will be the first to elute from the analyzer column and the component with the highest absorption coefficient will be the last to elute. The components are thus issued in bands by the continuously flowing carrier gas.

Representative applications for selector valves in gas chromatography include switching a predetermined vapor sample into the carrier gas stream, reversing the flow of carrier gas for back flushing slow-eluting sample components, and switching the sample through a first column only, or through a first column followed by a second column.

These and like operations are advantageously performed by a rotary selector valve in which ports terminating in a stationary plate selectively register with grooves of an abutting rotatable plate. Rotary valve structures presently known in the art, however, when loaded to provide the high sealing forces required under high pressure-high temperature conditions tend to introduce tipping and rocking moments about axes perpendicular to the axis or rotation of the rotatable plate. As a result, it has been extremely difficult to maintain the absolutely parallel intimate relationship between the faces of the plates which is necessary to prevent fluid leakage between the passages therein or contamination of the vapor samples by air leakage. The problem of sealing is particularly arduous when helium is used as the carrier gas, since its extremely small molecules are especially difficult to contain.

It is an object of this invention to provide a rotary selector valve having the ability to operate without leakage at high pressures and temperatures, e.g. 50 p.s.i.g., 200° C., over an extended period of use. In particular, this invention substantially eliminates the application of tipping or rocking moments to the movable valve body.

Another feature of this invention is that the loading force between the stationary and movable plates may be readily varied after assembly of the valve to accommodate different operating conditions and compensate for valve wear.

A still further advantage of a preferred embodiment of the present invention is that the movable and stationary plates are easily removed and others substituted so that a given valve may be easily and quickly modified in the field or laboratory to perform a different valving operation.

Other and further objects, features and advantages of the present invention will become apparent as the description proceeds.

Briefly, in accordance with a preferred form of the present invention, a rotary selector valve includes a housing mounting a stationary plate and a movable plate abutted against the stationary plate and rotatable relative thereto by an actuator member extending external of the valve housing. Each plate includes a plurality of passages which selectively register with passages of the other upon rotation of the movable plate. An intimate seal between the stationary and movable plates is provided by a force-applying means which concentrates the compressive force of a spring solely along the axis of rotation of the movable plate. This concentrated force is dispersed by a backing pressure plate so that the entire surfaces of the movable and stationary plates are loaded evenly. In the preferred embodiment of the invention described hereinafter, this loading force is provided by a compression spring and a force-applying member having a symmetrical arcuate surface, such as a hemisphere, tangential with a backing plate at a point thereon coaxial with the axis of rotation of the movable plate. Torques are transmitted to the movable plate via a flexible coupling which applies essentially a pure couple to the movable plate without introducing additional forces along radial or longitudinal axes. This valve structure obviates tipping and rocking moments between the plates so as to provide an extremely effective seal therebetween. Hence, valves constructed according to the invention can be operated under high pressure and temperature conditions without incurring any leakage both when the valve plates are stationary with one another and when the movable plate is rotated relative to the stationary plate.

The preferred embodiment of the invention further includes means whereby the loading force provided by the compression spring may be varied by rotating the valve actuator member. The actuator shaft is rotatably mounted in a rotor member coupled to the movable plate and includes a threaded end portion engaged with a spring retainer member. Rotation of the shaft relative this rotor member provides axial translation of the spring retainer member to vary the spring compression. After adjustment of the spring tension to achieve the desired loading force, a set screw is tightened to prevent relative movement between the shaft and the rotor member. Rotation of the actuator member then provides a corresponding rotation of the movable plate.

A more thorough understanding of this invention may be obtained by a study of the following detailed description taken in connection with the accompanying drawings in which:

FIG. 1 is a perspective view of a selector valve constructed in accordance with the present invention with the outer casing partially broken away;

FIG. 2 is a cross-sectional view taken substantially along line 2—2 of FIG. 1 and along line 2a—2a of FIG. 6 for the flexible coupling portion thereof;

FIG. 3 is an enlarged view in elevation of the force-applying member, the flexible coupling mechanism, and the movable and stationary valve plate members;

Figure 8:
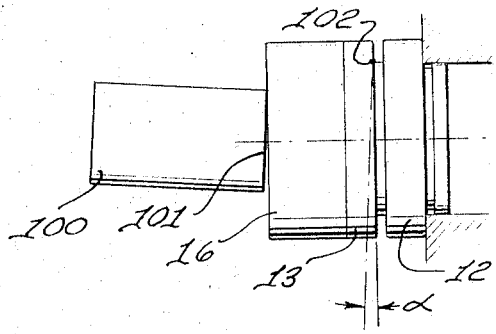
Figure 13A:
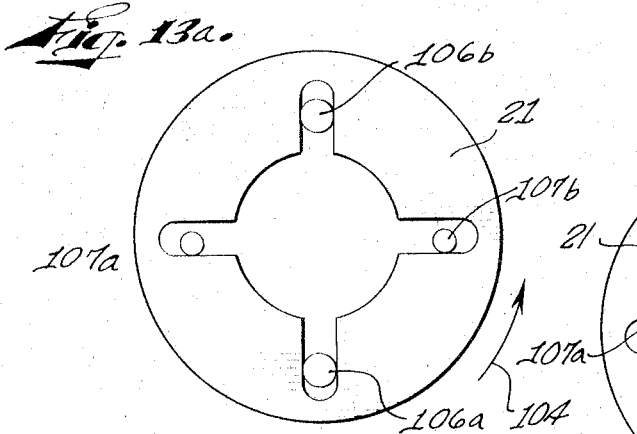
Figure 14:
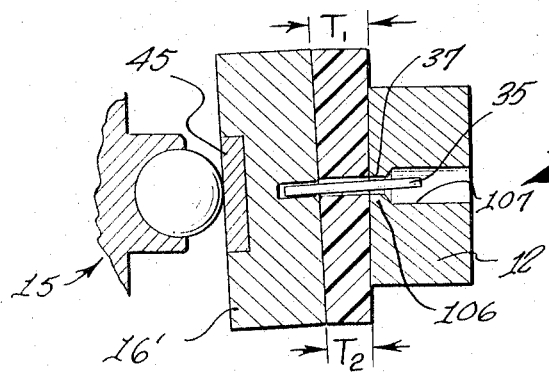

FIGS. 4, 5, and 6 are cross-sectional views taken respectively along lines 4—4, 5—5 and 6—6 of FIG. 2;

FIG. 7 is an exploded view of the internal structure of the valve illustrated in FIGS. 1 through 6;

FIG. 8 is a view in elevation illustrating the manner in which a representative prior art rotary selector valve structure applies a tipping moment to the movable valve body;

FIG. 9 is a schematic of a chromatographic system including the selector valve of the invention wherein a single column may be back-flushed by rotating the valve actuator through an angle of 90°;

FIG. 10 is a schematic of a chromatographic system incorporating the valve of this invention with modified valve plates wherein a stripper column may be connected in series with the primary column in one valve position and the stripper column independently back-flushed with a 45° rotation of the valve;

FIG. 11 illustrates a schematic of a chromatographic system incorporating the valve of this invention with a modified stationary and movable plate structure the system incorporating dual columns, one of which is continuously back-flushed when the other is connected to the vapor sample-carrier gas stream;

FIGS 12a b and c illustrate the substantial advantage derived when the actuator member applies only a pure moment to the rotary valve body;

FIGS. 13a and b are plan views illustrating the manner in which the flexible coupling of the invention applies only a pure moment to the movable valve body; and FIG. 14 is an enlarged elevation view of the backing plate and the movable and stationary valve body structure particularly illustrating structure which prevents the center shaft from applying tipping moments to the movable valve body.

Referring now to the figures, rotary selector valve 10 includes a housing 11 in which is mounted a stationary valve plate 12 and a movable valve plate 13. Passages in the stationary plate 12 connect to respective conduits 14 which extend to the outside of the housing 11. An extremely effective seal between the abutting faces of the stationary and movable plates is provided by a force-applying member 15 abutted a backing plate 16 of the movable plate 13. Actuator shaft member 20 extending external of the housing 11 and coupling member 21 provide means for rotating the movable plate while avoiding the application of tipping moments to this plate.

The housing 11 comprises respective end members 25, 26 joined to oppositely disposed side members 27, 28. End member 26 conveniently includes a circular aperture 30 through which the conduits 14 extend to the outside of the housing. This aperture also abuts an annular shoulder 31 formed on the bottom surface of the stationary valve plate 12. Rotation of the stationary plate 12 relative to the housing member 27 is prevented by a pin 32 extending from the end member 26 into a peripheral slot 33 of the stationary plate.

Backing plate 16 includes an extending shaft 35 which extends through the center aperture 36 of movable plate 13 into a corresponding center aperture 37 of the end stationary plate 12. A pin 38 engages a peripheral slot 39 of the movable plate 13 (FIG. 7) so that the backing and movable plates rotate together with respect to the stationary plate about the axis defined by shaft 35. Pin 38 may also extend within an indented arcuate segment 40 of the stationary plate 12 to limit movement of plate 13 to a predetermined angular rotation. Generally, as described in more detail hereinafter, the travel is limited to a 45 or 90° angle, depending on the particular valve body and portion configuration.

Each of the conduits 14 are connected to passages of the stationary valve plate 12 which terminate in ports formed on the internal face of the stationary valve plate. These ports register with grooves formed on the internal face of the rotary valve plate 13. Typically, each groove spans two ports and rotation of the movable plate 13 through a predetermined angle causes each groove to span an alternate pair of ports, thereby changing the valve's flow geometry.

Advantageously, the stationary plate 12 is formed of a stainless steel, such as Type 316, and the movable plate 13 is formed of ceramic and glass-filled tetrafluoroethylene resin sold commercially under the trademark Teflon. A movable plate so constructed is slightly resilient in comparison to the stationary plate so as to automatically compensate for small tolerances in the movable and stationary valve bodies, especially in the valve constructed according to this invention which avoid, as described hereinafter, the application of tipping moments to the movable valve body. The abutting faces of these members are preferably precision lapped so as to be optically flat within 25 and 60 millionths of one inch, respectively. Also, it is preferable to lap the opposite face of the movable plate 13 and the abutting face of the backing plate 16.

Force-applying member 15 has a symmetrical arcuate surface, such as a hemisphere, advantageously provided by an exposed portion of a hardened ball bearing 41. The arcuate surface is tangential with the surface of the backing plate 16 at the point thereon coaxial with the axis of rotation of movable plate. Backing plate 16 preferably comprises a stainless steel member of fairly substantial thickness so that the point contact loading force exerted by ball 41 will be uniformly dispersed by plate 16 to uniformly load the entire surface of the movable plate 13. For extremely high sealing pressures exerted by the member 15, the hardened insert 45 shown in FIG. 14 may be located at the point of contact.

Ball 41 is retained in a sliding piston member 50 having a socket 51 formed at one end for retaining the ball and a cylindrical cavity 52 formed in the other end for retaining one end of a compression loading spring 54. This spring is advantageously formed of a high temperature nickel alloy. The other end of the loading spring is retained in oppositely disposed spring retainer member 55 having a cylindrical cavity 56 formed in the end oppositely disposed from cavity 53 of piston 50.

The piston 50 and spring retainer member are mounted in a generally cylindrical rotor 60 having a cylindrical cavity therein for a substantial portion of its length open at one end to admit actuator shaft member 20, the members 50 and 55 and loading spring 54. The shaft actuator member 20 includes an end portion 70 extending through a circular aperture 71 formed in the other end of rotor 60, a diametrically enlarged portion 72 and an end portion 73 threadedly engaged with an internally threaded aperture 74 of spring retainer member 55. Rotation of member 55 with respect to the rotor 60 is prevented by a pin 75 extending within the interior of the rotor 60 in engagement with a longitudinal slot 76 formed on the peripheral surface of the member 55 (FIG. 5). A set screw 80 threadly engaged in a radial opening in the side of the rotor 60 is adapted to engage with a flattened planar portion 81 of the diametrically enlarged portion of the actuator shaft member 20. Rotor or cylinder 60 is rotatably mounted with respect to the housing by a thrust bearing 85. As shown, this bearing is preferably a ball thrust bearing for reducing the torque required to rotate the actuator shaft 20. This shaft is journaled in a stationary bearing member 87 affixed within a cylindrical cavity of housing end member 25.

Rotational movement imparted to rotor 60 is transferred to movable plate 13 and backing plate 16 by flexible drive coupling member 21. This member provides plural degrees of freedom along the radial and longitudinal axes while preventing rotational movement between the rotor 60 and the pressure plate 15 and preferably applies only a pure moment to the plate 15. This type of flexible coupling is advantageously provided by parallel, non-contacting pins respectively attached to the rotor and pressure plate off-center from their axis of rotation and received in a radially slotted member which is movable both axially and radially with respect to the pins. In the preferred embodiment shown in the figures, flexible coupling 21 comprises a generally disc-shaped member having a circular aperture 90 concentric with and encompassing the force-applying member 15 with a substantial gap therebetween and four radial slots 91 disposed at 90° intervals along the circumference of the walls of aperture 90. A pair of pins 92a, 92b separated by an angle of 180° extend from the end of rotor 60 and are disposed in oppositely disposed ones of the slots 91. In like manner, a pair of pins 93a, 93b separated by an angle of 180° extend from the upper surface of the backing plate 16 and engage the remaining slots 91. The sizing of the slots 91 to the pins 92, 93 is such that the pins may be freely translated in the slots. Accordingly, the cylinder 60 and the backing plate 16 are free to translate along mutually perpendicular axes orthogonal to the valve rotational axis and as a result, these members may pivot about these mutually perpendicular axes relative one another without transmitting any longituding forces to the backing plate. However, relative rotational movement about axis 35 between the rotor 60 and backing plate 16 is prevented by engagement of the slots 91 with the respective pins 92, 93. Thus, torque is transmitted between the actuator shaft 20 and the movable plate 13, this torque being transmitted, as shown in the substantially exaggerated view of FIG. 3, even though the axes of the rotor and valve plates may not be in perfect alignment. A slight amount of misalignment, of course, will be present in any valve structure due to necessary manufacturing tolerances. However, significant advantage of this invention is that even a relatively large misalignment may be tolerated since the arcuately shaped loading force applicator member applies a substantially point contact force at the rotational axis although the axes of the rotor and backing plate be non-parallel (FIG. 3).

As described above, a particular advantage of the invention is that the ball force applicator and flexible coupling cooperate to prevent the application to the backing plate of forces parallel to the rotational axis. Such forces produce moments which tend to tip the movable plate relative to the stationary plate.

Figure 12:
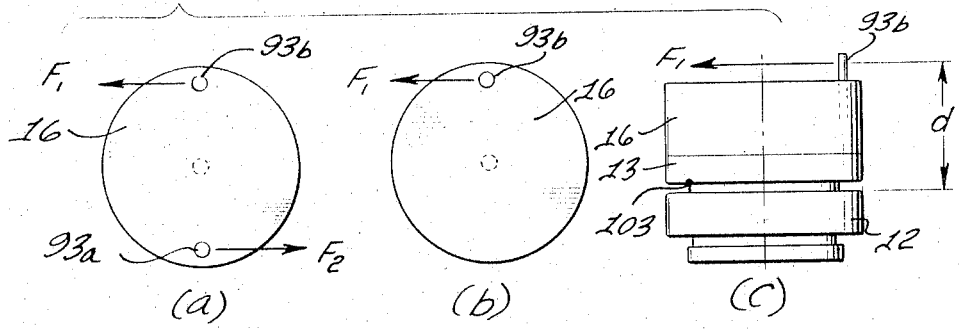

FIGS. 12 and 13 illustrate particular improvements in rotary valve seals which result from the flexible coupling of this invention. As shown in FIG. 12a, equal magnitude but oppositely directed forces are preferably applied pins 93a and 93b of the stationary plate 16. These forces produce a pure couple only, thereby producing only the desired rotation of the plate 16 and the movable valve body keyed thereto. Contrariwise, if only the single force $F_1$ is applied pin 93b, as shown in FIGS. 12b and c, a moment equal to the product of the force $F_1$ and the distance d tends to tip the movable valve body 13 about an axis 103 perpendicular to the axis of rotation.

Figure 13B:
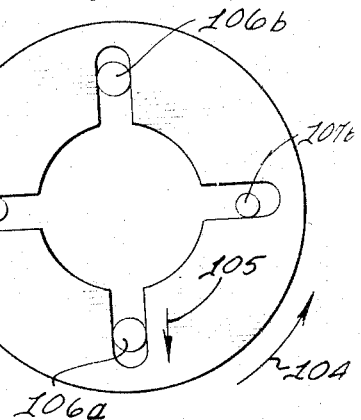

FIGS. 13a and 13b illustrate the manner in which the flexible coupling 21 functions to apply only a pure couple to the backing plate 16, regardless of tolerances in the valve components. Thus, in the valve shown, pins 106a and b attached to the rotor are only slightly smaller than the radial grooves of the coupling disc 21, whereas the pins 107a and 107b attached to the plate 16 are substantially smaller. It is to be understood that any or all of the pins may be undersized, the particular sizes shown being by way of example only.

If the rotor is then rotated in a counterclockwise direction as indicated by arrow 104, the pins 106a and 106b will engage oppositely disposed slots of the disc 21 and apply thereto a couple. Only the pin 107b of plate 16 will be engaged at this point. However, before a force of any magnitude is applied to the pin 107b, the disc 21 will be caused to translate along the diametrical axis defined by the slots engaged by pins 106a and 106b, as indicated by arrow 105, until the other pin 107a of plate 16 is engaged by its slot in the coupling disc. Further rotation of the disc 21 produces equal and opposite forces on the pins 107a, 107b to provide the desired pure moment upon the backing plate 16 and its associated movable valve plate.

The above-described operation of the coupling disc 21 is provided by the plural radial slots separated by 90° angles and engaged by the oppositely disposed pins separated by angles of 180°. These angle values are the preferred ones; however, the rotary movement of the rotor 60 will be transformed into a substantially pure couple for driving the movable valve body 13 so long as the rotor and backing plate are free to translate relative one another through axes which are only approximately perpendicular one another.

Still another structural feature of the present invention is that the axle 35 is small in diameter and is permitted to pivot a substantial distance out of parallel with the longitudinal axis of the valve. This operation is provided, as shown in FIG. 14, by an aperture in the stationary valve plate having a first portion of small diameter and a second thicker portion of larger diameter. The first portion 106 controls the transverse movement of the movable plate relative to the stationary plate and the second portion 107 permits considerable pivotal movement of the pin. In the specific example shown in FIG. 14, the resilience of the movable plate has resulted in one edge assuming a slightly smaller thickness $T_2$ than the thickness $T_1$ of the opposite edge. If the pin 35 is allowed to pivot out of perpendicular with the stationary plate 12, an intimate contact is maintained between the opposing faces of the movable and stationary plates.

The improvements in loading the stationary and movable plates afforded by the present invention may be further understood by reference to the representative prior art structure of FIG. 8 wherein the compressive force of a spring is applied to the backing plate 16 by a solid cylindrical member 100 having a flat planar surface 101 abutting the upper surface of the backing plate 16. Assuming a misalignment between the longitudinal axes of the load-applying member 100 and the backing plate 16 as shown, a moment will be applied to the backing plate 16 and adjoining movable plate 13 which tends to tip the movable plate 13 with respect to stationary plate 12 about an axis 102 perpendicular to the drawing. As described hereinabove, even extremely small angle separation between the plates cannot be tolerated since it will cause serious leakage and contamination of micro-volumes of vapors and liquids.

An advantage of the present invention is that substantially all of the valve components may be assembled and disassembled in the field for routine maintenance and repair, and for substitution of different valve plate bodies for performing different valving functions. The assembly of the valve is as shown in the exploded view of FIG. 7. During assembly, the actuator member 20 should be threaded into the spring retainer member 55 to the full extent of its threaded end 73 so that the minimum compressive force is required to assemble the members within the housing 10.

The rotor 60 and associated components provide the important advantage of a selectively variable loading force. Thus, the spring tension on the piston 50 can be varied by loosening the socket set screw 80 (by a suitable wrench 83 through the opening 82 formed in the casing member 11, FIG. 4) until no portion of the set screw extends within the interior of rotor 60. Actuator shaft 20 is then free to rotate with respect to the rotor 60. As it is rotated with respect thereto, the spring retainer member 55 is translated within the cylindrical cavity 61 of rotor 60 to either increase or decrease the compression of spring 54. When the desired loading force is achieved, the set screw is tightened so as to engage the flattened surface 81 of the diametrically enlarged portion 80 of the actuator member 20 and key the actuator member 20 to the rotor 60. Rotational movement of actuator 20 is then transferred via rotor 60 and coupling member 21 to the backing plate 16 and movable valve plate 13.

The valve of this invention can be used with innumerable slider groove geometries and valve port combinations for performing a plurality of micro-volume gas handling applications. Three exemplary groove and port combinations are shown in FIGS. 9, 10 and 11. In FIG. 9, the movable plate 109 includes a pair of arcuate passages 110, 111 each extending through an angle of 90° and disposed oppositely about the axis of rotation 35. The stationary plate 12 incorporates four passages terminating in ports 112, 113, 114, 115 at the face of the movable plate. In the system shown schematically in this figure, a selector valve is incorporated in a single column gas chromatographic instrument. In the position shown, the sample carried by a flow of carrier gas is introduced through inlet conduit 116 through port 113, passage 110 and out port 112 into the chromatographic column 120. After passing through the column, the effluent passes through the valve via port 114, passage 111 and out port 115 to a detector 121. In this operation, the direction of vapor flow is indicated by the solid arrows. By rotating the movable plate through an angle of 90°, it will be seen that the vapor flow following conduit 116 is reversed, the vapor now passes through column 120 in the opposite direction as indicated by the dotted arrows. The system shown in FIG. 9 is used for back-flushing the column. In a typical operation, before the components to be detected have emerged from the column, the valve is switched to the back-flush position. The components remaining in the column at this time are distributed through the column according to their relative elution times. During the back-flush, the components travel back through the column at approximately the same speed as in the forward direction, with the result that the components regroup and go to the detector 121 as a single peak.

In the system of FIG. 10, the rotary valve plate 129 is provided for arcuate cavities 130 each extending through an angle of 45°. The stationary plate is provided with eight ports respectively located at 45° intervals. This valve configuration is particularly adapted for introducing a stripper column before the analysis column, as shown. Thus, the gas and sample mixture introduced into the inlet conduit 135 passes through one of the valve passages, the stripper column 137, through another valve passage and into the analytical column 138. An independent purge gas flow enters conduit 139 and is conducted via the alternative valve passages and into conduit 140. After the components of interest have entered the analytical column, the valve is actuated, thereby rotating the movable plate 29 through an angle of 45°. The purging gas supplied conduit 139 is then connected into the tail of the stripper column 137 and the heavy components back-flushed into an auxiliary vent. This mode of operation allows the analysis of light components in a sample containing both light and heavy components, without the necessity of waiting for the heavy components to be eluted from both columns, and also serves to protect the analysis column.

A still further modified movable plate 150 is shown in FIG. 11, this plate incorporating inner arcuate grooves 151, 152 and outer arcuate grooves 153, 154 formed at respectively different radii from the axis of rotation. The stationary plate incorporates four inner ports 155 and four outer ports 156. This arrangement permits two columns 160, 161 to be used with a single detector, the sample gas and carrier gas selectively passing through either analysis column 160 (in the position shown) or analysis column 161 when the valve is actuated 90°. The other column is continuously subjected to a back-flush purge to remove traces of previous samples and prolong the column life. Thus, two dissimilar columns may be used for analytical versatility or a short column used for scanning and a long column of the same type used for analysis.

Although exemplary embodiments have been disclosed and discussed, it will be understood that other applications of the invention are possible and that the embodiments disclosed may be subjected to various changes, modifications and substitutions without necessarily departing from the spirit of the invention.

I claim:
1. In a valve having a housing, an actuator member rotatably mounted by said housing, a valve body maintained stationary with respect to said housing, and a movable valve body rotatably mounted with respect to said housing, with each valve body including passages which selectively register with passages of the other upon rotational movement of said movable valve body;
    means for applying a loading force concentrated substantially solely along the axis of rotation of said movable and stationary plates in intimate contact comprising
        a backing plate parallel to and abutting said movable valve body and
        a ball bearing tangential with said backing plate at the point thereof on the axis of rotation;
    means for producing said loading force comprising
        a cylindrical member rotatably mounted within said housing,
        a piston axially movable within said cylindrical member and having a socket formed in its outward end for retaining said ball bearing,
        a coil retainer member axially movable within said piston, and
        a compression spring retained between said piston and said coil retainer member;
    means for selectively varying the loading force produced by said compression spring comprising
        an end portion of said actuator member threadedly engaged by said coil retainer member so that rotation of said actuator member with respect to said cylindrical member varies the axial position of said coil retainer member and hence the loading force produced by said compression spring and
        means for keying said actuator member to said cylindrical member so that torques supplied said actuator member are transmitted to said cylindrical member; and
    means coupling said cylindrical member to said backing plate for transforming rotary movement of said cylindrical member into a substantially pure couple for driving said backing plate, said means comprising
        a generally disc-shaped member having plural radial slots separated by approximately 90° angles and an aperture concentric with said ball bearing,
        a pair of pins separated by approximately 180° and extending from said cylindrical member parallel said rotational axis and engaged in opposite ones of said radial slots, and
        another pair of pins separated by approximately 180° and extending from said backing member parallel said rotational axis and engaged in the other set of oppositely disposed radial slots, said pins being free to translate both radially and along axes parallel the rotational axis of said movable valve body so that the rotational axes of said cylindrical member and said backing plate may be non-parallel without introducing any tipping moments between said stationary and movable valve bodies.

2. The rotary selector valve according to claim 1 comprising,
    an axle of small diameter serving as the pivot axis of said backing plate and movable valve body upon said stationary plate and journaled in an opening in said stationary plate having a first portion of narrow aperture and a second longer portion of wider aperture so that the transverse movements of said members are controlled while permitting the axle to pivot out of parallel with respect to the axis of rotation of said valve activating means.

References Cited by the Examiner

UNITED STATES PATENTS

| | | | |
|---|---|---|---|
| 548,751 | 10/1895 | Ferry | 251—180 X |
| 919,443 | 4/1909 | Lewis | 251—180 X |
| 1,473,282 | 11/1923 | Cosgrove | 251—180 X |
| 2,736,339 | 2/1956 | Asbury et al. | 137—625.46 |
| 2,845,947 | 8/1958 | Griswold | 137—625.46 X |
| 3,203,249 | 8/1965 | Jentzsch et al. | 251—180 X |

FOREIGN PATENTS 819,029  10/1951  Germany.

M. CARY NELSON, *Primary Examiner.*

HENRY T. KLINKSIEK, *Examiner.*